L. SCHOLL, Jr.
ARTIFICIAL FISH BAIT.
APPLICATION FILED JAN. 6, 1914.
1,102,089.
Patented June 30, 1914.
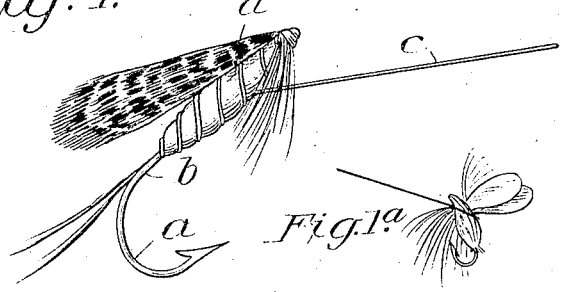
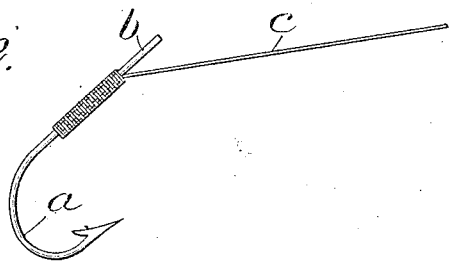
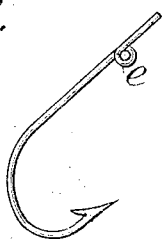

UNITED STATES PATENT OFFICE.

LOUIS SCHOLL, JR., OF ECHO, OREGON.

ARTIFICIAL FISH-BAIT.

1,102,089.

Specification of Letters Patent. Patented June 30, 1914.

Application filed January 6, 1914. Serial No. 810,579.

*To all whom it may concern:*

Be it known that I, LOUIS SCHOLL, Jr., a citizen of the United States, and a resident of Echo, in the county of Umatilla and State of Oregon, have invented an Improvement in Artificial Fish-Bait, of which the following is a specification.

My invention is an improvement in artificial flies, and consists more particularly in the attachment of the leader to the upper portion of the hook shank and in the arrangement of the head portion of the body of the fly on the tail of the shank or at a point above the attachment of the leader, whereby important advantages are attained.

The invention is hereinafter described with reference to the accompanying drawing, in which, Figure 1 is a side view of my invention, Fig. 1ª shows a modification, Fig. 2 is a side view of the hook and leader, without the fly proper, Fig. 3 is a side view showing a modification of the hook.

As shown in Figs. 1 and 2, the hook $a$ has a straight, plain shank $b$. The leader $c$ is attached to the shank above the middle of the length of the shank and the fly proper $d$ is attached so that its head portion or about one-third to one-fourth its length is above such point of attachment of the leader. In Fig. 1ª the leader is shown attached to the body of the fly instead of the hook proper. By this arrangement of the fly proper $d$, relative to the leader, or rather to the point of attachment of the latter, and by the attachment of the head portion of the fly to the upper portion of the shank above the leader, it is apparent that the head portion of the fly will project on the surface of the water when the hook is being pulled toward the angler, and the head portion will flit about or oscillate on the surface of the water so as to act in a life-like manner and thus more readily attract the fish. In other words, by leaving the head end of the fly practically loose from the leader, it is free to wabble when drawn toward the angler. Further, after casting, as soon as the angler pulls slightly on the line, the fly comes readily to the surface of the water, and, as it is drawn toward the angler, the fly tends to run laterally or wabble slightly and thus takes an uneven course toward the angler, which renders it more attractive to the fish.

The invention has another object in that, when cast the fly does not strike the water so flat as those of the ordinary kind. In other words, it does not hit the water with a "slap", but falls more gently and strikes partly sidewise. Again, after a fish has been hooked, particularly a large one, that has to be "played", the leader being attached to the hook so that the portion of the shank adjacent the hook is very short, the fish has less leverage and is less liable to free itself from the hook.

In Fig. 3, the hook shank is shown provided with a bend forming a loop or eye $e$ to serve for attachment of the leader.

The term or designation "fly" is to be taken in a broad sense, and as indicating any insect or other form of artificial bait which may be used.

I claim:

1. An artificial fishing fly, comprising a hook, a leader attached to the hook shank above the middle of its length, and a fly body attached to the shank with its upper or head portion secured to the free upper end of the shank, above the point of attachment of the leader.

2. An improved artificial fishing fly, comprising a hook, a leader attached to the hook shank at a point below its end so that the terminal of the shank is left free, and a fly proper attached to the hook shank with its head portion secured to the free end of the shank, as described.

LOUIS SCHOLL, JR.

Witnesses:
E. E. ELDER,
F. T. GEORGE.